June 8, 1965     N. S. BRATTON     3,187,550
TORQUE MEASURING DEVICE
Filed Sept. 26, 1961
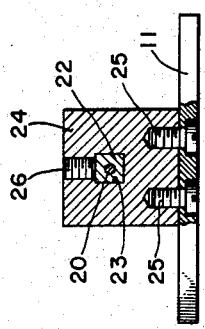
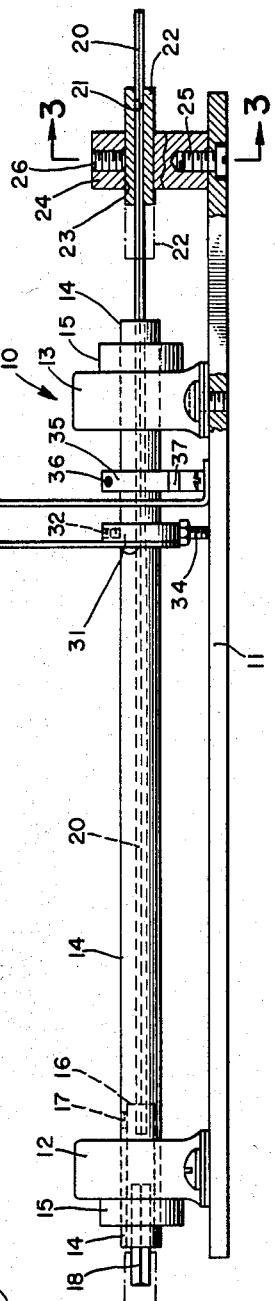
INVENTOR.
NEAL S. BRATTON
BY *Lyon & Lyon*
ATTORNEYS.

3,187,550
TORQUE MEASURING DEVICE

Neal S. Bratton, Pasadena, Calif., assignor to Richmont, Inc., Monrovia, Calif., a corporation of California
Filed Sept. 26, 1961, Ser. No. 140,942
4 Claims. (Cl. 73—1)

This invention relates to torque measuring apparatus useful in setting, checking or calibrating torque tools such as torque wrenches, screw drivers or the like. It is an important object of this invention to provide a rugged torque measuring instrument of this type which may be readily calibrated without requiring extensive disasesmbly of the device. Other and more detailed objects and advantages will appear hereinafter.

In the drawings:

FIGURE 1 is a perspective view showing a preferred embodiment of this invention.

FIGURE 2 is a side elevation, partly in section.

FIGURE 3 is a transverse sectional elevation taken substantially on the lines 3—3 as shown in FIGURE 2.

Referring to the drawings:

The torque measuring device generally designated 10 includes a stationary base 11 having a pair of axially spaced bearings 12 and 13 fixed thereon. A tube 14 is rotatably supported in the bearings 12 and 13 and may be provided with collars 15 to prevent endwise shifting. A torque transmitting element 16 is fixed within one end of the tube 14 by means of the set screw 17 and has an exposed part hexagonal 18 projecting therefrom for engagement by a wrench, screwdriver, or other torque tool. A torque wrench assembly 19 is shown diagrammatically in phantom lines in FIGURE 2.

A hexagonal torsion rod 20 is fixed at one end to the element 16 and projects axially through the interior of the tube 14. The other end of the torsion rod 20 projects axially from the end of the tube 14 and is slidably received within the hexagonal opening 21 which extends longitudinally through the square calibration bar 22. This calibration bar 22 is slidably received within the square recess 23 provided in the support 24. The support 24 is fixed to the base 11 by any suitable means such as, for example, the threaded elements 25. A set screw 26 threaded into the support 24 engages one side of the square calibration bar 22 to hold it in adjusted position with respect to the base 11.

A bracket 27 fixed to the base 11 supports a stationary calibrated scale 28. A pointer 29 having a swinging end 30 cooperates with the scale 28. The pointer 29 is carried on a hub 31 mounted on the tube 14 at a location between the bearings 12 and 13. A set screw 32 serves to hold the hub 31 and pointer 29 in adjusted position on the outer surface of the tube 14. As best shown in FIGURE 1, the hub 31 carries an arm 33 having an adjustable set screw 34 adapted to contact the upper surface of the base 11. This set screw 34 is used to adjust the zero position of the pointer 29 with respect to the scale 28.

A second hub 35 is mounted on the tube 14 by means of a set screw 36 and this hub carries a laterally projecting arm 37 which serves as an overload stop when it contacts the base 11 to limit turning movement of the tube 14.

For initial calibration of the device 10 a torque load of known magnitude is applied to the torque receiving projection 18. This may be accomplished by means of a dead weight acting at a known lever arm, as will be readily understood. The position of the pointer end 30 as compared with the dial 28 should indicate the known torque load. If the reading is too high, the calibration bar 22 is moved toward the projecting element 18 to shorten effective length of the torsion rod 20. When the proper position of the calibration bar 22 is reached the reading of the pointer end 30 will correspond to the magnitude of the known torque load applied.

Having fully described my invention, it is to be understood that I am not to be limited to the details herein set forth, but that my invention is of the full scope of the appended claims.

I claim:

1. In a torque measuring device of the class described, the combination of a base, a pair of axially spaced bearings mounted on the base, a tube mounted to turn in said bearings, cooperating parts on said tube and said base for indicating turning movement of said tube, a torque transmitting element fixed to the tube at one end thereof and having a part projecting therefrom to receive a torque load, a non-circular torsion rod having one end fixed to said element, said torsion rod extending through the interior of the tube and projecting exteriorly thereof, a calibration bar having a longitudinal, non-circular opening slidably and non-rotatably receiving the projecting portion of said torsion rod, and means for securing said calibration bar in adjusted position relative to said base.

2. In a torque measuring device of the class described, the combination of a base, a pair of axially spaced bearings mounted on the base, a tube mounted to turn in said bearings, cooperating parts on said tube and said base for indicating turning movement of said tube, a torque transmitting element fixed within the tube at one end thereof and having a part projecting therefrom to receive a torque load, a non-circular torsion rod having one end fixed to said element said torsion rod extending through the interior of the tube and projecting exteriorly thereof, a calibration bar having a longitudinal, non-circular opening slidably and non-rotatably receiving the projecting portion of said torsion rod, a stationary support on the base having a non-circular recess, said calibration bar having a non-circular portion slidably and non-rotatably mounted for movement within said recess, and means for securing said calibration bar in adjusted position on said stationary support.

3. In a torque measuring device of the class described, the combination of a base, a pair of axially spaced bearings mounted on the base, a tube mounted to turn in said bearings, cooperating parts on said tube and said base for indicating turning movement of said tube, a torque transmitting element fixed to the tube at one end thereof and having a part projecting therefrom to receive a torque load, a torsion rod having one end fixed to said element, said torsion rod in cross-section comprising a regular polygon, said torsion rod extending through the interior of the tube and projecting exteriorly thereof, a calibration bar having a longitudinal opening slidably and non-rotatably receiving the projecting portion of said torsion rod, a stationary support on the base having a square portion slidably and non-rotatably mounted for movement within said recess, and means for securing said calibration bar in adjusted position on said stationary support.

4. In a torque measuring device of the class described, the combination of a base, a pair of axially spaced bearings mounted on the base, a tube mounted to turn in said bearings, a pointer on said tube cooperating with a scale on said base for indicating turning movement of said tube, a torque transmitting element fixed to the tube at one end thereof and having a part projecting therefrom to receive a torque load, a hexagonal torsion rod having one end fixed to said element, said torsion rod extending through the interior of the tube and projecting exteriorly thereof, a calibration bar having a hexagonal opening slidably and non-rotatably receiving the projecting portion of said torsion rod, means slidably supporting the calibration bar on said base, and means for securing said calibration bar in adjusted position relative to said base.

References Cited by the Examiner

UNITED STATES PATENTS 2,885,884   5/59   Nelson _____ 73—1

ISAAC LISANN, *Primary Examiner.*

LOUIS R. PRINCE, *Examiner.*